US008195316B2

(12) United States Patent
Takashima

(10) Patent No.: US 8,195,316 B2
(45) Date of Patent: Jun. 5, 2012

(54) AUDIO APPARATUS

(75) Inventor: Noriyuki Takashima, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1137 days.

(21) Appl. No.: 12/020,231

(22) Filed: Jan. 25, 2008

(65) Prior Publication Data

US 2008/0226085 A1 Sep. 18, 2008

(30) Foreign Application Priority Data

Mar. 12, 2007 (JP) ................................ 2007-061315

(51) Int. Cl.

*G06F 17/00* (2006.01)
*H04R 5/00* (2006.01)
*H04B 1/00* (2006.01)

(52) U.S. Cl. ................. 700/94; 381/18; 381/21; 381/86

(58) Field of Classification Search .................... 700/94; 381/17–23, 86, 302, 307

See application file for complete search history.

(56) References Cited

U.S. PATENT DOCUMENTS 5,172,415 A * 12/1992 Fosgate ........................... 381/22
5,999,630 A * 12/1999 Iwamatsu ....................... 381/17
6,928,169 B1 8/2005 Aylward
7,764,805 B2 7/2010 Tomita et al.
7,920,711 B2 4/2011 Takashima et al.
2004/0032955 A1* 2/2004 Hashimoto et al. ............. 381/18
2005/0031128 A1* 2/2005 Tomita et al. ................... 381/18
2005/0271215 A1* 12/2005 Kulkarni ......................... 381/18
2006/0013101 A1 1/2006 Kawana et al.
2006/0256969 A1 11/2006 Takashima et al.
2009/0252339 A1* 10/2009 Obata et al. ..................... 381/18

FOREIGN PATENT DOCUMENTS

JP 64-000900 1/1989
JP 01-144900 6/1989
JP 03-110999 5/1991
JP 2000-295699 10/2000
JP 2004-364240 12/2004
JP 3682032 5/2005
JP 2006-025034 1/2006
JP 2006-217210 8/2006
JP 2006-319694 11/2006
WO WO2005/069274 7/2005
WO WO2006/008697 1/2006

OTHER PUBLICATIONS

Association of Radio Industries and Businesses, "Receiver for Digital Broadcasting" ARIB STD-B21, Sep. 29, 2005, ARIB, v. 4.4, 32-35.*

* cited by examiner

*Primary Examiner* — Jesse Elbin
(74) *Attorney, Agent, or Firm* — Brinks Hofer Gilson & Lione

(57) ABSTRACT

An audio apparatus includes an input unit for inputting stereo signals in which multi-channel surround-sound signals are mixed in accordance with a predetermined algorithm and a parameter indicating encoded contents of the algorithm, a surround-sound signal generator for generating left-side surround-sound signals and right-side surround-sound signals by decorrelating left-side signals and right-side signals contained in the stereo signals, and a controller for controlling the decorrelation performed by the surround-sound signal generator based on the parameter.

20 Claims, 12 Drawing Sheets

FIG. 1A

PRIOR ART

| FLAG IN AAC STREAM | SIGNAL PROCESSING AT RECEIVER | |
|---|---|---|
| matrix_mixdown_idx | k | DOWN-MIX ALGORITHM |
| 0 | $1/\sqrt{2}$ | $L_t = a \times \left(L + 1/\sqrt{2} \times C + k \times Sl\right) \cdots (2.1.1)$ |
| 1 | $1/2$ | |
| 2 | $1/2\sqrt{2}$ | $R_t = a \times \left(R + 1/\sqrt{2} \times C + k \times Sr\right) \cdots (2.1.2)$ |
| 3 | 0 | |

$a = 1/\sqrt{2}$

FIG. 1B

PRIOR ART

| FLAG IN AAC STREAM | SIGNAL PROCESSING AT RECEIVER | |
|---|---|---|
| matrix_mixdown_idx | k | DOWN-MIX ALGORITHM |
| 0 | $1/\sqrt{2}$ | $L_t = a \times \left(L + 1/\sqrt{2} \times C - k \times (Sl + Sr)\right) \cdots (2.2.1)$ |
| 1 | $1/2$ | |
| 2 | $1/2\sqrt{2}$ | $R_t = a \times \left(R + 1/\sqrt{2} \times C + k \times (Sl + Sr)\right) \cdots (2.2.2)$ |
| 3 | 0 | |

$a = 1/\sqrt{2}$

| matrix_mixdown_idx | VALUE OF k | CROSS-CORRELATION COEFFICIENT | VALUE OF μ |
|---|---|---|---|
| 0 | $1/\sqrt{2}$ | SMALL (ABOUT 0.5) | (ASSUMED AS) REFERENCE VALUE EXAMPLE : 0.001 |
| 1 | $1/2$ | ↑ | ↑ |
| 2 | $1/2\sqrt{2}$ | ↓ | ↓ |
| 3 | 0 | LARGE (ABOUT 0.8) | MINIMUM SETTABLE VALUE EXAMPLE : 0.00001 |

FIG. 11

| matrix_mixdown_idx | VALUE OF k | CROSS-CORRELATION COEFFICIENT | ADDITION RATIO |
|---|---|---|---|
| 0 | $1/\sqrt{2}$ | SMALL (ABOUT 0.5) | (ASSUMED AS) REFERENCE VALUE EXAMPLE : FRONT:0, REAR:100(%) |
| 1 | $1/2$ | ↑ | ↑ |
| 2 | $1/2\sqrt{2}$ | ↓ | ↓ |
| 3 | 0 | LARGE (ABOUT 0.8) | MAXIMUM SETTABLE VALUE EXAMPLE : FRONT:40, REAR:60(%) |

FIG. 12

| matrix_mixdown_idx | VALUE OF k | CROSS-CORRELATION COEFFICIENT | VALUE OF $\mu$ | ADDITION RATIO |
|---|---|---|---|---|
| 0 | $1/\sqrt{2}$ | SMALL (ABOUT 0.5) | (ASSUMED AS) REFERENCE VALUE EXAMPLE : 0.001 | (ASSUMED AS) REFERENCE VALUE EXAMPLE : FRONT:0, REAR:100(%) |
| 1 | $1/2$ | ↑ | ↑ | ↑ |
| 2 | $1/2\sqrt{2}$ | ↓ | ↓ | ↓ |
| 3 | 0 | LARGE (ABOUT 0.8) | MINIMUM SETTABLE VALUE EXAMPLE : 0.00001 | MAXIMUM SETTABLE VALUE EXAMPLE : FRONT:40, REAR:60(%) |

| matrix_mixdown_idx | VALUE OF k | CROSS-CORRELATION COEFFICIENT | OUTPUT GAIN |
|---|---|---|---|
| 0 | $1/\sqrt{2}$ | SMALL (ABOUT 0.5) | (ASSUMED AS) REFERENCE VALUE |
| 1 | $1/2$ | ↑ | ↑ |
| 2 | $1/2\sqrt{2}$ | ↓ | ↓ |
| 3 | 0 | LARGE (ABOUT 0.8) | MAXIMUM SETTABLE VALUE |

FIG. 16

| matrix_mixdown_idx | VALUE OF k | CROSS-CORRELATION COEFFICIENT | ADDITION RATIO | DELAY INSERTION |
|---|---|---|---|---|
| 0 | $1/\sqrt{2}$ | SMALL (ABOUT 0.5) | (ASSUMED AS)<br>REFERENCE VALUE<br>EXAMPLE : FRONT:0, REAR:100(%) | (ASSUMED AS)<br>REFERENCE VALUE<br>0 |
| 1 | $1/2$ | ↑ | ↑ | ↑ |
| 2 | $1/2\sqrt{2}$ | ↓ | ↓ | ↓ |
| 3 | 0 | LARGE (ABOUT 0.8) | MAXIMUM SETTABLE VALUE<br>EXAMPLE : FRONT:40, REAR:60(%) | MAXIMUM SETTABLE VALUE<br>EXAMPLE : 32sample@44.1kHz |

AUDIO APPARATUS

RELATED APPLICATIONS

The present application claims priority to Japanese Patent Application Number 2007-061315, filed Mar. 12, 2007, the entirety of which is hereby incorporated by reference.

BACKGROUND OF THE INVENTION

1. Field of the Invention

The present invention relates to audio apparatuses. In particular, the present invention relates to an audio apparatus for reproducing stereo signals down-mixed in two channels containing surround-sound components.

2. Description of the Related Art

With the widespread proliferation of terrestrial digital broadcast, 5.1-channel surround-sound broadcast is expected to increase in the future. 5.1-channel surround-sound broadcast can be fully available in only areas where full segments (12 or 13 segments) can be received. Vehicle-mounted apparatuses, which are mounted on moving objects, change in their reception environments as a result of movement of the moving objects, and thus have difficulty in maintaining 5.1-channel full-segment reception. When the moving object leaves a reception area that employs the full segment scheme, the reception is automatically switched to one-segment broadcast reception. As a result, the vehicle-mounted apparatus changes its reproduction operation from 5.1-channel surround-sound reproduction to 2.1-channel stereo-sound reproduction. Thus, the reproduced sound quality changes significantly. For the vehicle-mounted apparatus, therefore, down-mixed 2-channel stereo sound output is preferable for the tuner thereof, even during reception of 5.1-channel surround-sound broadcast. With this arrangement, even when the reception of the moving object is switched to one-segment, the stereo sound output is maintained, and thus, a large-scale change in the audio system can be restricted.

Currently, moving objects that have 5.1-channel surround speakers for entertainment enhancement are not uncommon. Thus, it is also desired that surround-sound signals be generated from down-mixed stereo signals and be reproduced as 5.1 channel-surround sound, even when stereo signals in which the down-mixed 5.1-channel surround-sound is mixed are reproduced.

For example, Japanese Patent No. 3682032 discloses a technology for generating surround-sound signals from 2-channel stereo signals. In this technology, an adaptive filter is used to extract components that are highly correlated with R signals in L signals of input stereo signals, and the extracted components are subtracted from the L signals to generate surround-sound signals SL. Similarly, components that are highly correlated with the L signals in the R signals of the input stereo signals are extracted, and the extracted components are subtracted from the R signals to generate surround-sound signals SR. This provides decorrelated surround-sound signals SL and SR.

As described above, the vehicle-mounted apparatus can also down-mix 1-channel surround-sound signals into 2-channel stereo signals and reproduce the resulting signals. In addition, a scheme in which down-mixed stereo signals are transmitted by a broadcast station is also available. For example, the ARIB Standard (described in ARIB STD-B21 6.2) defines a case of down-mixing 5.1-channel surround sound into 2-channel sound, as shown in FIGS. 1A and 1B. FIG. 1A illustrates stereo signals Lt and Rt in the absence of a pseudo surround flag, and FIG. 1B illustrates stereo signals Lt and Rt in the presence of the pseudo surround flag. Lt and Rt indicate stereo signals, Sl and Sr indicate surround-sound signals, and C indicates signals for a center speaker.

A broadcast station or a creator that creates audio data encodes down-mixed stereo signals Lt and Rt containing surround-sound signals Sl and Sr in accordance with a predetermined algorithm and transmits the encoded signals. A receiver decodes the encoded data stream to reproduce the down-mixed stereo signals Lt and Rt. The encoded data stream contains a pseudo surround enable signal, and the presence/absence of pseudo surround sound is identified based on the logic high or logic low of the enable signal. The data stream further contains a flag (a parameter k) for identifying a ratio of contained surround-sound signals Sl and Sr. For example, in the absence of a pseudo surround flag, as shown in FIG. 1A, the parameter k is 1/√2 for a flag “0” and the parameter k is ½ for a flag “1”.

When the parameter k is 0 in the equations 2.2.1 and 2.1.2 shown in FIGS. 1A and 1B, the stereo signals Lt and Rt are given as equations 2.3.1 and 2.3.2 below:

$$Lt = L + \frac{1}{\sqrt{2}} \times C \tag{2.3.1}$$

$$Rt = R + \frac{1}{\sqrt{2}} \times C \tag{2.3.2}$$

When the signals Lt and Rt are assumed to be typical stereo signals, a cross-correlation coefficient between the two signals is statistically given as an average of about 0.7. FIG. 2 is a graph showing cross-correlation coefficients of stereo signals. The typical stereo signals described above exhibit a line L1. Since the C (center) signals are added to the L signals and R signals in equations 2.3.1 and 2.3.2 noted above, the cross-correlation coefficient increases relatively and exhibits a line L2, which has a higher cross-correlation coefficient than the line L1. For comparison, when the signals Lt and Rt are the same (i.e., mono), the cross-correlation coefficient is 1.0. In this state, how the surround-sound signals Sl and Sr are mixed is expressed by equations 2.1.1 and 2.1.2. In surround-sound creation, the correlation between signals L and signals Sl is low and the correlation between signals R and signals Sr is also low, That is, when Sl and Sr are added to equations 2.3.1 and 2.3.2, respectively, the cross-correlation coefficient between Lt and Rt decreases. The ratio of the addition is further changed by the value of a parameter k (the flag value: matrix_mixdown_idx), and the cross-correlation coefficient between Lt and Rt changes. In the graph shown in FIG. 2, a line L3 represents a cross-correlation coefficient for the parameter k=½, and it is shown that the cross-correlation coefficient is smaller than that of the line L1 for typical stereo signals.

When a vehicle-mounted apparatus performs decorrelation processing by using stereo signals Lt and Rt generated by the down-mix scheme, a change of the cross-correlation coefficient (i.e., a change of the parameter k) also causes a change in the outputs (i.e., low-correlation components) of decorrelated surround-sound signals. A change in the output level occurs depending on whether the cross-correlation coefficient is large or small. That is, when the cross-correlation coefficient is large, the output level of the decorrelated surround-sound signals decreases, and when the cross-correlation coefficient is small, the output level of the decorrelated surround-sound signals increases. In order for a listener to maintain a homogeneous output level, it is necessary to control the decorrelation processing by using the parameter k of the terrestrial digital receiver.

SUMMARY OF THE INVENTION

Accordingly, the present invention has been conceived to overcome such a problem in the related art, and an object of the present invention is to provide an audio apparatus that is capable of providing homogeneous outputs when down-mixed stereo signals are used to perform surround-sound output.

A first embodiment of the present invention provides an audio apparatus. The audio apparatus includes an input unit for inputting stereo signals in which surround-sound signals are mixed in accordance with a predetermined algorithm and encoding information specifying encoded contents of the algorithm; a surround-sound signal generator for generating surround-sound signals SL and surround-sound signals SR by decorrelating left-side signals and right-side signals contained in the stereo signals; and a controller for controlling the decorrelation performed by the surround-sound signal generator based on the encoding information.

Preferably, the surround-sound signal generator includes a first surround-sound signal generator for generating the surround-sound signals SL by extracting components that are highly correlated with right-side signals in the left-side signals of the stereo signals and subtracting the extracted components from the left-side signals, and a second surround-sound signal generator for generating the surround-sound signals SR by extracting components that are highly correlated with left-side signals in the right-side signals of the stereo signals and subtracting the extracted components from the right-side signals. The controller controls the highly-correlated-component extraction performed by the first and second surround-sound signal generators, based on the encoding information.

Preferably, the first surround-sound signal generator updates a filter coefficient of an adaptive filter by using an adaptive algorithm to extract the components that are highly correlated with the left-side signals in the right-side signals, and the second surround-sound signal generator updates a filter coefficient of an adaptive filter by using an adaptive algorithm to extract the components that are highly correlated with the right-side signals in the left-side signals. The controller changes a value of a step-size parameter for determining an adaptation speed of the filter coefficients of the adaptive filters in the first and second surround-sound signal generators, based on the encoding information. Preferably, the controller reduces the value of the step-size parameter, as the cross-correlation coefficient of the input stereo signals increases.

In another embodiment of the present invention, the audio apparatus includes an input unit for inputting stereo signals in which surround-sound signals are mixed in accordance with a predetermined algorithm and encoding information specifying encoded contents of the algorithm, and a surround-sound signal generator for generating surround-sound signals SL and surround-sound signals SR by decorrelating left-side signals and right-side signals contained in the stereo signals. The audio apparatus further includes a first adder for adding, at a predetermined level, left-side signals of the stereo signals to the surround-sound signals SL output from the surround-sound signal generator; a second adder for adding, at a predetermined level, right-side signals of the stereo signals to the surround-sound signals SR output from the surround-sound signal generator; and a controller for controlling the ratio of the addition of the left-side signals at the first adder and the right-side signals at the second adder based on the encoding information. Preferably, the controller increases the addition ratio of the left-side signals at the first adder and the right-side signals at the second adder as the cross-correlation coefficient of the input stereo signals increases.

In still another embodiment of the present invention, the audio apparatus includes an input unit for inputting stereo signals in which surround-sound signals are mixed in accordance with a predetermined algorithm and encoding information specifying encoded contents of the algorithm, a first surround-sound signal generator for generating surround-sound signals SL by extracting components that are highly correlated with right-side signals in the left-side signals of the stereo signals and subtracting the extracted components from the left-side signals, and a second surround-sound signal generator for generating surround-sound signals SR by extracting components that are highly correlated with left-side signals in the right-side signals of the stereo signals and subtracting the extracted components from the right-side signals. The audio apparatus further includes a first adder for adding, at a predetermined level, the left-side signals of the stereo signals to the surround-sound signals SL output from the first surround-sound signal generator; a second adder for adding, at a predetermined level, the right-side signals of the stereo signals to the surround-sound signals SR output from the second surround-sound signal generator; and a controller for controlling the highly-correlated component extraction performed by the first and second surround-sound signal generators based on the encoding information and for controlling the ratio of the addition of the left-side signals at the first adder and the right-side signals at the second adder based on the encoding information.

Preferably, the controller reduces the highly-correlated components extracted by the first and second surround-sound signal generators and increases the addition ratio of the left-side signals at the first adder and the right-side signals at the second adder as the cross-correlation coefficient of the input stereo signals increases.

In a further embodiment of the present invention, the audio apparatus includes an input unit for inputting stereo signals in which surround-sound signals are mixed in accordance with a predetermined algorithm and encoding information specifying encoded contents of the algorithm, a surround-sound signal generator for generating surround-sound signals SL and surround-sound signals SR by decorrelating left-side signals and right-side signals contained in the stereo signals, a gain adjuster for adjusting an output gain of the surround-sound signals SL and the surround-sound signals SR generated by the surround-sound signal generator, and a controller for controlling the gain adjuster based on the encoding information. Preferably, the controller increases the output gain of the surround-sound signals SL and the surround-sound signals SR as the cross-correlation coefficient increases.

In still another embodiment of the present invention, an audio apparatus includes an input unit for inputting stereo signals in which surround-sound signals are mixed in accordance with a predetermined algorithm and encoding information specifying encoded contents of the algorithm, a surround-sound signal generator for generating surround-sound signals SL and surround-sound signals SR by decorrelating left-side signals and right-side signals contained in the stereo signals, a first delay processor for delaying the left-side signals of the stereo signals, a second delay processor for delaying the right-side signals of the stereo signals, a third delay processor for delaying the surround-sound signals SL, and a fourth delay processor for delaying the surround-sound signals SR. The audio apparatus further includes a first adder for adding, at a predetermined level, the left-side signals delayed by the first delay processor to the surround-sound signals SL delayed by the third delay processor; a second adder for adding, at a predetermined level, the right-side signals delayed by the second delay processor to the surround-sound signals SR delayed by the fourth delay processor; and a controller for controlling the ratio of the addition of the left-side signals at the first adder and the right-side signals at the second adder based on the encoding information and for controlling amounts of the delay of the first, second, third, and fourth delay processors.

In yet another embodiment of the present invention, an audio system includes an audio apparatus having the above-described features, a first set of speakers that output sound based on the left-side signals and the right-side signals of the stereo signals, and a second set of speakers that output sound based on the surround-sound signals SL and the surround-sound signals SR. Preferably, the audio system further includes a center speaker that is disposed in the vicinity of the middle of the first set of speakers and that outputs sound based on signals obtained by adding the left-side signals and the right-side signals of the stereo signals at a predetermined ratio, and a subwoofer that is disposed in the vicinity of the middle of the second set of speakers and that outputs sound based on low-frequency components of the stereo signals.

Because the decorrelation for generating surround-sound signals is controlled in accordance with the algorithms for mixing surround-sound signals into stereo signals, it is possible to provide a homogeneous output level of the surround-sound signals. In addition, because the addition ratio of the stereo signals to the surround-sound signals is controlled in accordance with the algorithm for mixing the surround-sound signals into the stereo signals, it is possible to provide a homogeneous output level of the surround-sound signals. Additionally, because output gain of the surround-sound signals is controlled in accordance with the algorithm for mixing the surround-sound signals into the stereo signals, it is possible to provide a homogeneous output level of the surround-sound signals. Moreover, because the amount of delay of the surround-sound signals is controlled in accordance with the algorithm for mixing the surround-sound signals into the stereo signals, it is possible to provide surround-sound signals that impart a spatial impression.

BRIEF DESCRIPTION OF THE DRAWINGS

FIGS. 1A and 1B are tables showing algorithms for down-mixing 5.1-channel surround audio signals into 2-channel stereo signals, FIG. 1A showing a case in the absence of a pseudo surround flag and FIG. 1B showing a case in the presence of a pseudo surround flag;

FIG. 11 is a table showing the relationship of the value of the parameter k and the addition ratio of stereo signals;

FIG. 12 is a table showing the relationship of the value of the parameter k, the step-size parameter μ, and the addition ratio in a third embodiment of the present invention;

FIG. 16 is a table showing the relationship of the value of the parameter k, the addition ratio of stereo signals, and delay time.

DESCRIPTION OF THE PREFERRED EMBODIMENTS

Embodiments of the present invention will be described in detail with reference to the accompanying drawings. A description will be given of an example of a vehicle-mounted audio apparatus for converting down-mixed stereo signals, received from a terrestrial digital receiver, into surround-sound signals.

Figure 2:
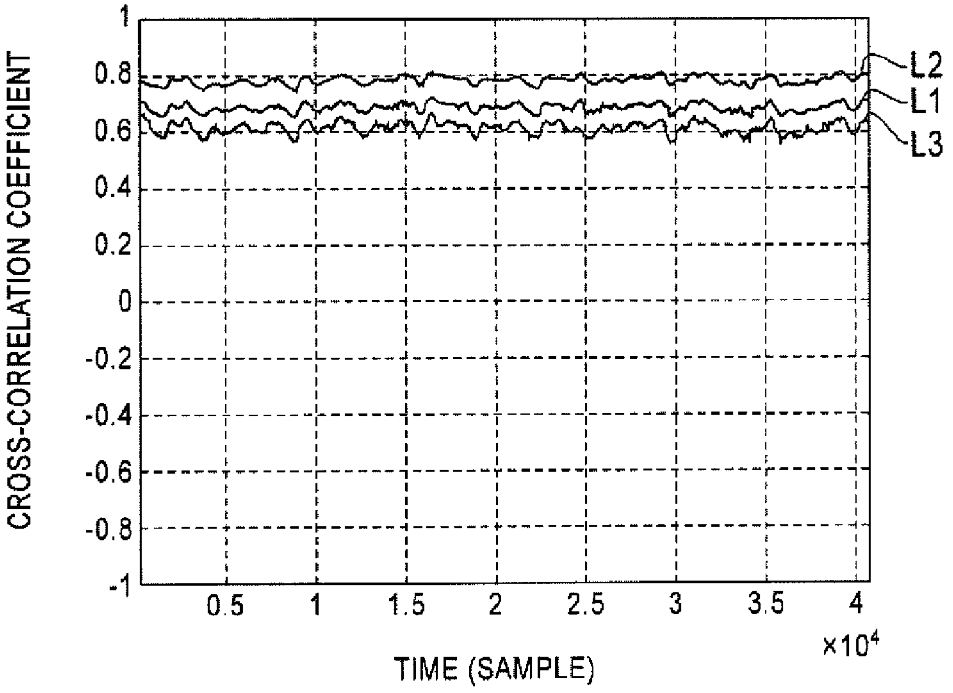
FIG. 2 is a graph illustrating cross-correlation coefficients of down-mixed stereo signals.
Figure 3:
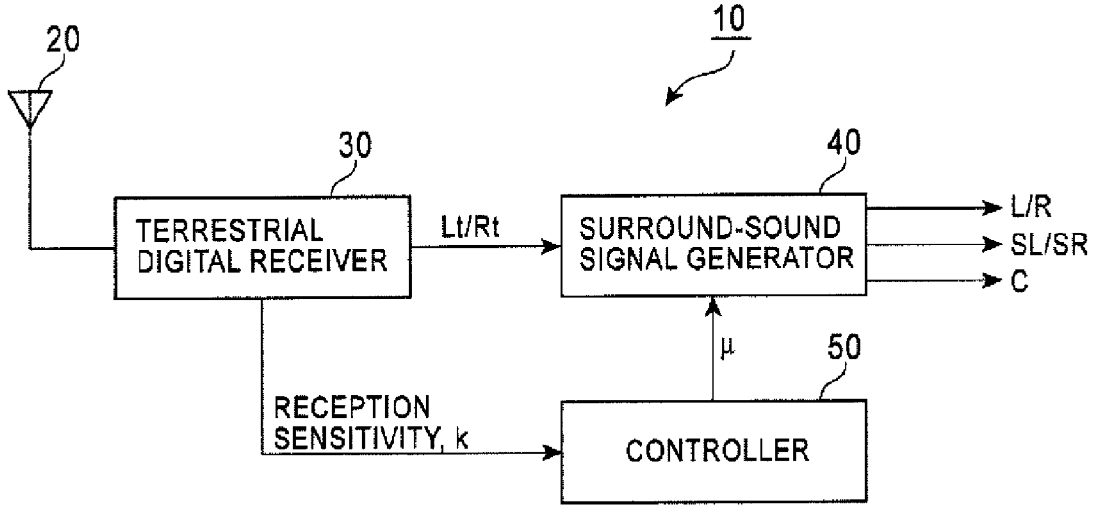
FIG. 3 is a block diagram showing the configuration of an audio apparatus according to a first embodiment of the present invention.

FIG. 3 is a block diagram showing the configuration of an audio apparatus according to a first embodiment of the present invention. A vehicle-mounted audio apparatus 10 includes an antenna 20, a terrestrial digital receiver 30, a surround-sound signal generator 40, and a controller 50. The antenna 20 receives terrestrial digital broadcast. The terrestrial digital receiver 30 receives RF (radio frequency) signals received by the antenna 20. The surround-sound signal generator 40 receives audio signals sent from the terrestrial digital receiver 30 and generates surround-sound signals 40. The controller 50 receives encoding information, such as the reception sensitivity of the terrestrial digital receiver 30 and a parameter k regarding a down-mix algorithm, and controls the surround-sound signal generator 40. The surround-sound signal generator 40 receives down-mixed 2-channel stereo signals Lt and Rt, and generates stereo signals L and R and surround-sound signals SL and SR therefrom. For generation of 5-channel surround-sound signals, the surround-sound signal receiver 40 generates signals C (Center) from added components of the stereo signals L and R.

Figure 4:
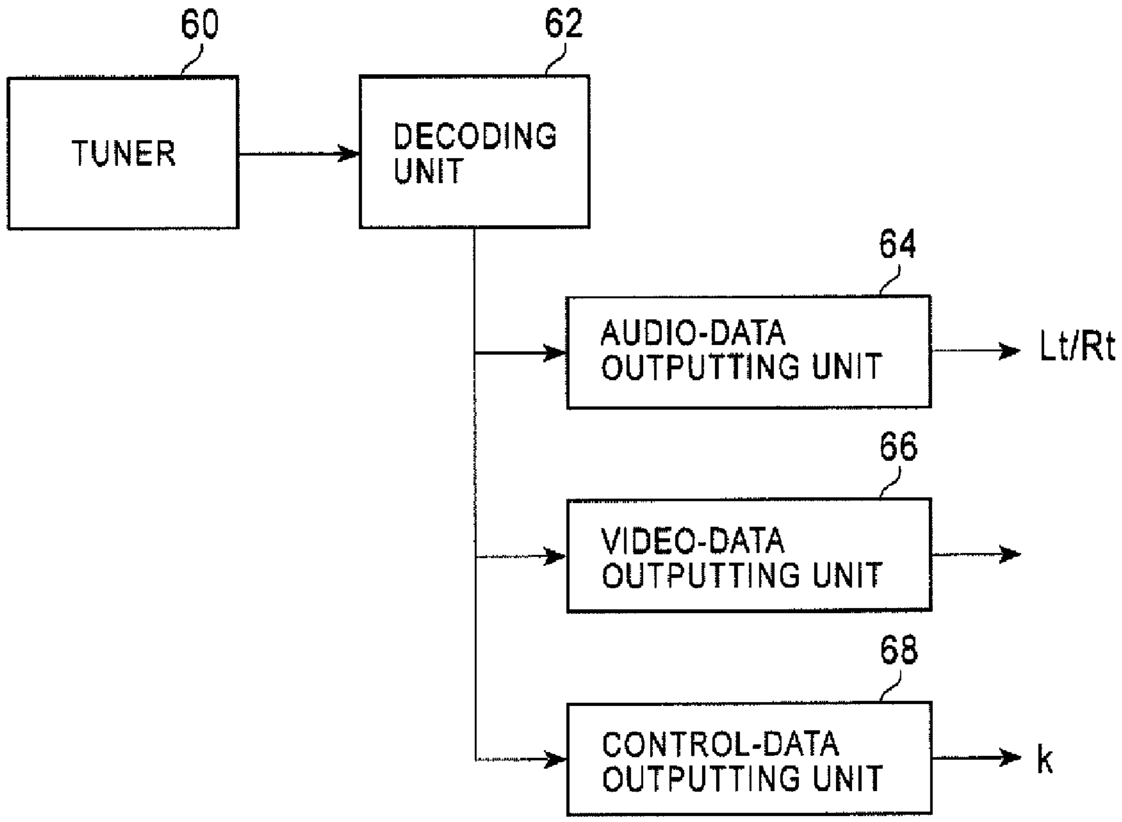
FIG. 4 is a block diagram showing the internal configuration of a terrestrial digital receiver shown in FIG. 3.

FIG. 4 is an example of the internal configuration of the terrestrial digital receiver 30. The terrestrial digital receiver 30 includes a tuner 60 for receiving digital broadcast, a decoding unit 62 for decoding an encoded digital-data stream, an audio-data outputting unit 64, a video-data outputting unit 66, and a control-data outputting unit 68. The audio-data outputting unit 64 extracts audio signals from the decoded data stream and outputs down-mixed stereo signals Lt and Rt. The video-data outputting unit 66 extracts video signals from the decoded data stream and outputs the video signals. The control-data outputting unit 68 extracts control signals from the decoded data stream and outputs the parameter k specifying the down-mix algorithm, a flag indicating the presence/absence of pseudo surround sound, and so on. The stereo signals Lt and Rt output from the audio-data outputting unit 64 are input to the surround-sound signal generator 40, while the parameter k and the flag output from the control-data outputting unit 68 are input to the controller 50.

Figure 5:
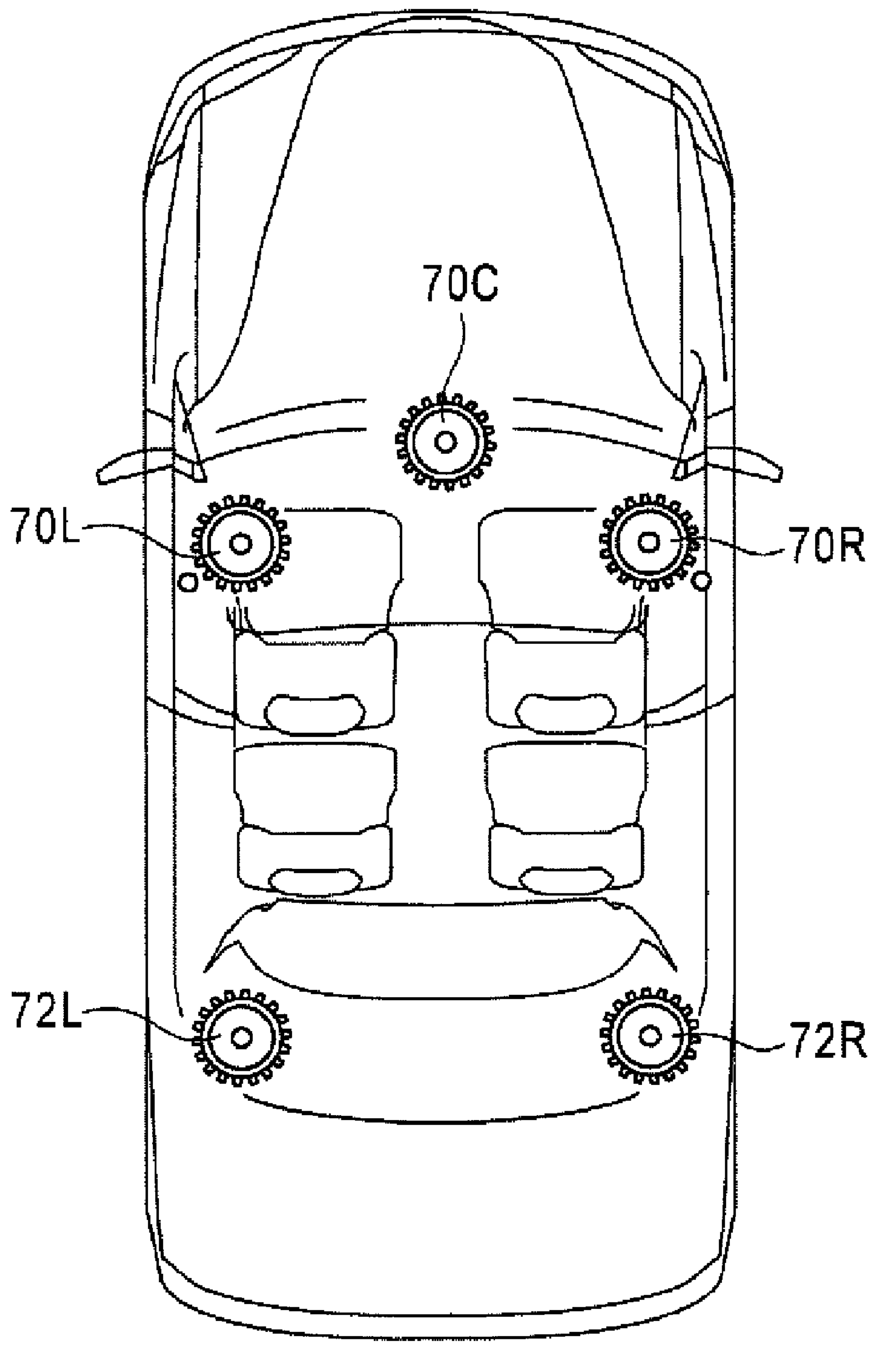
FIG. 5 is a schematic view showing the layout of speakers in a vehicle cabin.

FIG. 5 is a schematic view showing the layout of speakers in a vehicle cabin. Fronts speakers 70L and 70R are disposed at left and right front seats, respectively, and a center speaker 70C is disposed in the vicinity of the approximate middle of the front speakers 70L and 70R. Rear speakers 72L and 72R are disposed at the left and right side of the rear seats. A subwoofer 72SW (not shown) may be disposed in the vicinity of the approximate middle of the rear speakers 72L and 72R to provide a 5.1-channel surround sound space.

The stereo signals FL and FR of the surround-sound signal generator 40 are supplied to the front speakers 70L and 70R, and the center signals C are supplied to the center speaker 70C. The surround-sound signals SL and SR of the surround-sound signal generator 40 are supplied to the rear speakers 72L and 72R.

Figure 6:
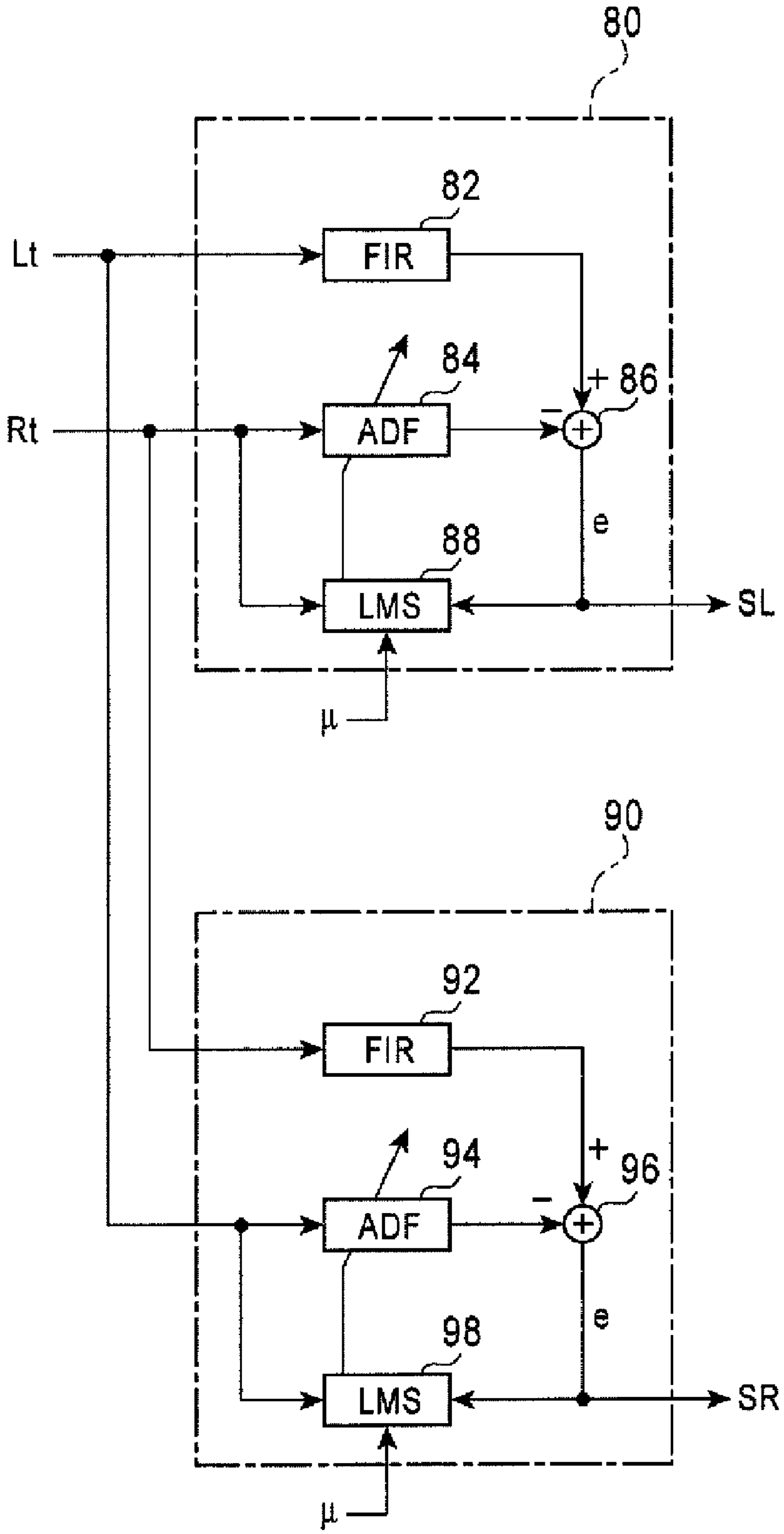
FIG. 6 is a diagram showing the internal configuration of a surround-sound signal generator shown in FIG. 3.

FIG. 6 is a diagram showing the internal configuration of the surround-sound signal generator 40 shown in FIG. 3. The surround-sound signal generator 40 includes an SL-signal generator 80 and an SR-signal generator 90. The SL-signal generator 80 includes an FIR (finite impulse response) filter 82, an adaptive filter (ADF) 84, an adder 86, and an LMS (least mean square) algorithm processor 88. The FIR filter 82 is used as an adaptive-filter modeling delay circuit, delays the input Lt signals by an amount of time corresponding to the number of taps (e.g., an amount of time for 16 taps in the case of 32 taps), and outputs the delayed Lt signals. The adaptive filter 84 has the same configuration as the FIR filter 82, and multiplies the input signals Rt by a predetermined tap coefficient vector W and outputs the resulting signals. The adder 86 subtracts the output signals from the adaptive filter 84 from the L signals output from the FIR filter 82, and outputs error signals e. Based on a step-size parameter μ, the LMS algorithm processor 88 updates the tap coefficient vector W of the adaptive filter 84 in accordance with an LMS algorithm that minimizes the power of the error signals e output from the adder 86. The step-size parameter μ for the LMS algorithm processor 88 is supplied from the controller 50. The error signals e output from the adder 86 become decorrelated surround-sound signals SL.

The SR-signal generator 90 is configured similarly to the SL-signal generator 80 and includes an FIR filter 92, an adaptive filter (ADF) 94, an adder 96, and an LMS algorithm processor 98. A step-size parameter μ is supplied from the controller 50 to the LMS algorithm processor 98. Error signals e are output from the adder 98 and become decorrelated surround-sound signals SR.

Figures 7, 8:
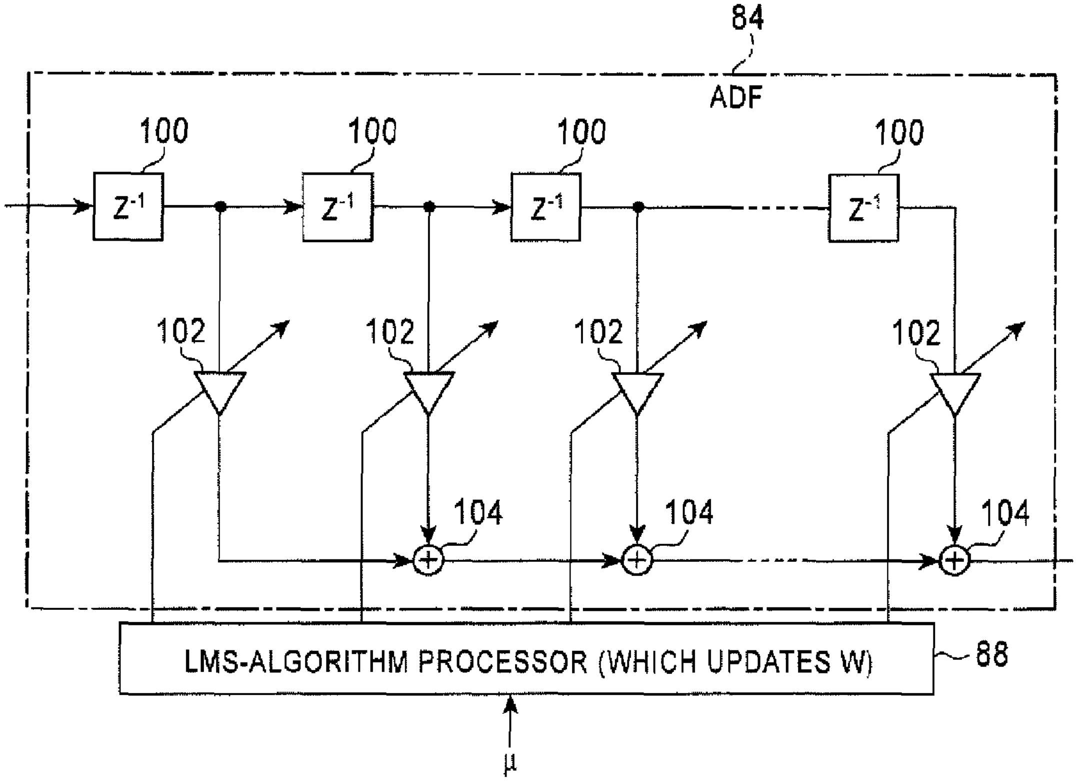
FIG. 7 is a diagram showing the configuration of an adaptive filter (ADF) shown in FIG. 6.
FIG. 8 is a table showing the relationship of the value of a parameter k and a step-size parameter μ.

FIG. 7 is a diagram showing a detailed configuration of the adapter filter 84 shown in FIG. 6. The adaptive filter 84 includes delay elements 100, multipliers 102, and adders 104. Each multiplier 102 multiplies a signal, held by the corresponding delay element 100, by a variable tap coefficient. Each adder 104 adds outputs of the multipliers 102. An LMS-algorithm processor 88 updates the values of the individual tap coefficients (multipliers) of the multipliers 102.

The LMS-algorithm processor 88 updates the values of the tap coefficients of the adaptive filter 84 so that the power of the error signals e output from the adder 104 is minimized. The LMS-algorithm processor 88 updates the values of the tap coefficients so that the adaptive filter 84 extracts components that are contained in the components of the input Rt signals and are highly correlated with the Lt signals. That is, the LMS algorithm processor 88 receives the Rt signals and the error signals e output from the adder 104, and processes the Rt signal and the error signals e in accordance with an LMS algorithm. Thus, the LMS-algorithm processor 88 outputs tap-coefficient update instructions to the multipliers 102 in the adaptive filter 84. Consequently, the values of the tap coefficients applied to the signals held by the delay elements 100 are changed.

As described above, the adaptive filter 84 extracts components highly correlated with the Lt signals in the Rt signals, and the adder 104 subtracts the extracted components from the Lt signals. Thus, the error signals e output from the adder 104 contain only components that are not highly correlated with the Rt signals in the Lt signals, and the error signals e are used as decorrelated surround-sound signals SL.

The adaptive filter 94 in the SR-signal generator 90 has the same configuration as the adaptive filter 84 shown in FIG. 7. The adaptive filter 94 thus generates decorrelated surround-sound signals SR containing only components that are not highly correlated with the Lt signals in the Rt signals.

The LMS algorithm uses the instantaneous square error as an evaluation quantity. The LMS-algorithm processor 88 updates the value of a filter coefficient W according to the following:

$$W(n+1)=W(n)+2\mu\cdot e(n)\cdot R(n)$$

where μ indicates a step-size parameter. When the value of the step-size parameter μ is set to be large, the convergence speed of the filter coefficient W increases, and conversely, when the value of the step-size parameter μ is set to be small, the convergence speed of the filter coefficient W decreases. In other words, when the step-size parameter μ increases, the convergence speed for extracting correlated components decreases and the surround-sound signals SL and SR become signals containing highly-decorrelated components. In contrast, when the step-size parameter μ decreases, the convergence speed for extracting correlated components decreases and the surround-sound signals SL and SR become signals containing some degree of correlated components.

As described above, for the down-mixed stereo signals Lt and Rt, when the addition ratio of surround-sound signals Sl and Sr changes in accordance with the value of the parameter k, i.e., when the cross-correlation coefficient is changed and stereo signals Lt and Rt having a high correlation coefficient (having a low value of parameter k) are input to the SL-signal generator 80 and the SR-signal generator 90, the output level of the surround-sound signals SL and SR decreases. In order to solve this problem, the controller 50 in the present embodiment changes the step-size parameter μ supplied to the adaptive algorithm processors 88 and 98.

It is preferable that, as the value of the parameter k becomes small, i.e., as the correlation coefficient becomes large, the controller 50 change the step-size parameter μ so that the value thereof becomes small. Reducing the step-size parameter μ causes generation of the surround-sound signals SL and SR containing some degree of correlated components to prevent a reduction in output level.

FIG. 8 is a table showing one example of the relationship of the value of the parameter k and the step-size parameter μ. As shown in FIG. 8, for the parameter k=1/√2, the controller 50 sets the step-size parameter μ to 0.001 and uses the value as a reference value. As the parameter k changes in order of ½, ½√2, and 0, i.e., as the cross-correlation coefficient increases, the step-size parameter μ becomes smaller. For the parameter k=0, μ is set to a minimum settable value, for example, 0.00001.

Figure 9:
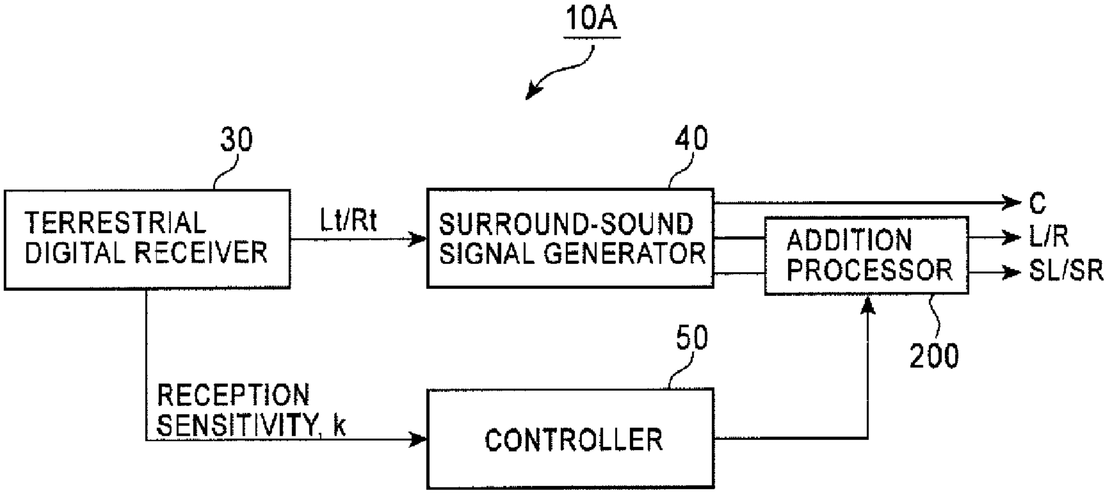
FIG. 9 is a block diagram showing the configuration of an audio apparatus according to a second embodiment of the present invention.

A second embodiment of the present invention will now be described. FIG. 9 is a block diagram showing the configuration of an audio apparatus according to a second embodiment. As shown in FIG. 9, an audio apparatus 10A includes an addition processor 200 in addition to the configuration of the first embodiment. In the first embodiment, the step-size parameter μ is changed in accordance with the value of the parameter k. In the second embodiment, however, the addition ratio of the stereo signals Lt and Rt to the surround-sound signals SL and SR output from the surround-sound signal generator is controlled.

Figure 10:
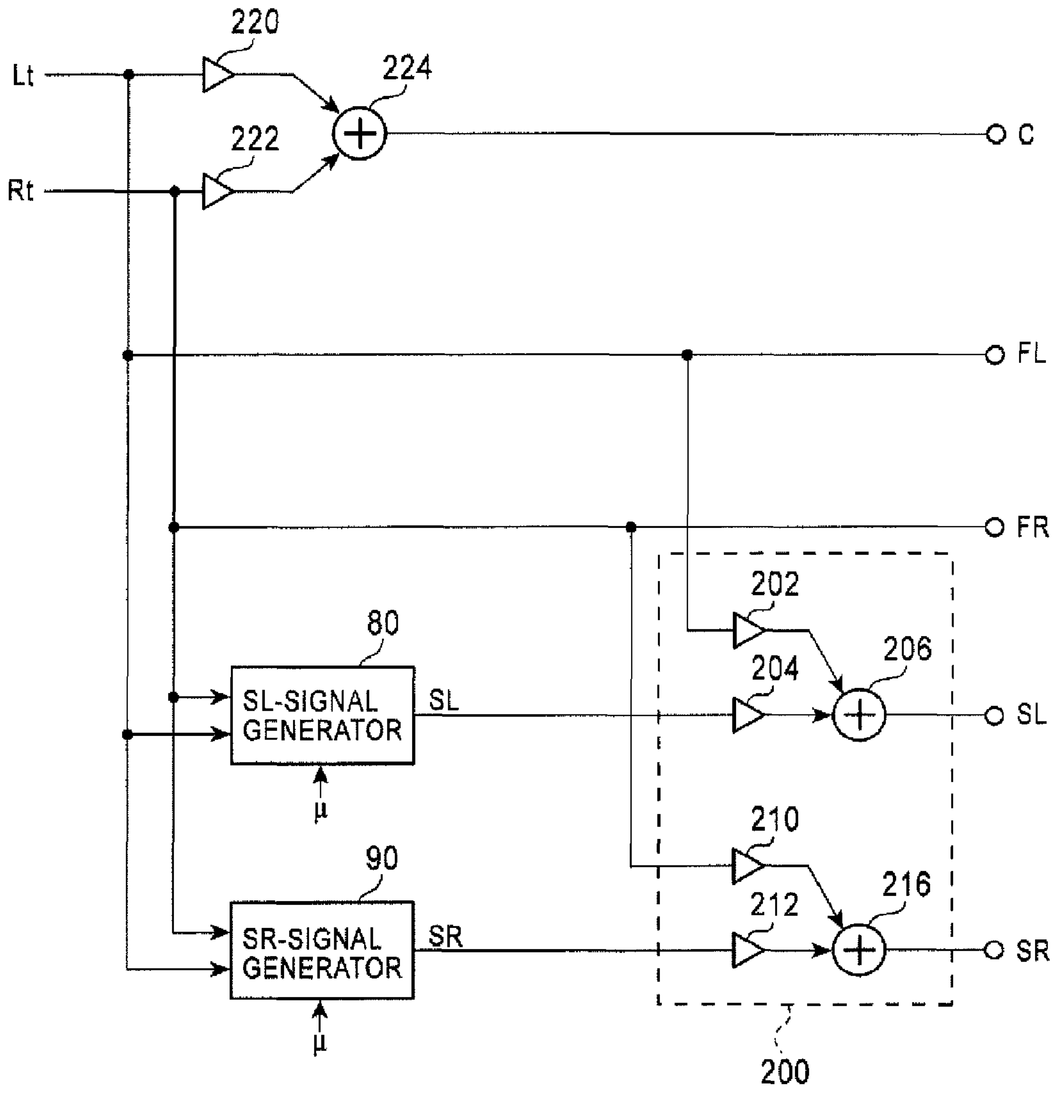
FIG. 10 is a diagram showing the configuration of an addition processor shown in FIG. 9.

FIG. 10 is a diagram showing the configuration of the addition processor 200 shown in FIG. 9. The addition processor 200 includes amplifiers 202, 204, 210, and 212, a first adder 206, and a second adder 216. The amplifier 202 receives the Lt signals of stereo signals and adjusts the gain of the Lt signals, the amplifier 204 receives the surround-sound signals SL output from the SL-signal generator 80 and adjusts the gain of the surround-sound signals SL, and the first adder 206 adds an output of the amplifier 202 and an output of the amplifier 204. The amplifier 210 receives the Rt signals of the stereo signals and adjusts the gain of the Rt signals, the amplifier 212 receives the surround-sound signal SR output from the SR-signal generator 90 and adjusts the gain of the surround-sound signals SR, and the second adder 216 adds an output of the amplifier 210 and an output of the amplifier 212.

The step-size parameter μ input to the adaptive algorithm processor 88 of the SL-signal processor 80 and the adaptive algorithm processor 98 of the SR-signal processor 90 is fixed to, for example, 0.001. The controller 50, however, changes the addition ratio of the stereo signals Lt and Rt at the first and second adders 206 and 216 in accordance with the value of the parameter k. Amplifiers 220 and 222 adjust the gains of stereo signals Lt and Rt and an adder 224 adds 50% of the stereo signals Lt and 50% of the stereo signals Rt to generate center signals C.

FIG. 11 is a table showing one example of the relationship of the value of the parameter k and the addition ratio. As shown in FIG. 11, as the parameter k decreases (i.e., as the cross-correlation coefficient increases), the first and second adders 206 and 216 increase the addition ratio of the stereo signals Lt and Rt. For example, for the parameter k=1/√2, the controller 50 performs control so that no stereo signals Lt and Rt are added to the surround-sound signals SL and SR, and uses the value as a reference value. As the parameter k changes to ½ and further to ½√2, the controller 50 increases the addition ratio of the stereo signals Lt and Rt. For the parameter k=0, stereo signals Lt and Rt are added at a settable maximum value so as to satisfy, for example, Lt and Rt:SL and SR 40%:60%.

According to the second embodiment of the present invention, the stereo signals Lt and Rt having highly-correlated components are mixed with the corresponding surround-sound signals SL and SR having low-correlation components to perform level adjustment. In particular, since the mixing ratio of the stereo signals Lt and Rt increases as the parameter k becomes smaller (i.e., as the cross-correlation coefficient becomes larger), it is possible to prevent a reduction in the output power of the surround-sound signals SL and SR.

A third embodiment of the present invention will now be described. The third embodiment is a combination of the first embodiment and the second embodiment. That is, the controller 50 controls both the step-size parameter p for the adaptive algorithm processors 88 and 98 and the addition ratio for the addition processor 200 in accordance with the value of the parameter k.

FIG. 12 is a table showing one example of the relationship of the step-size parameter μ and the addition ratio. As shown in FIG. 12, for generation of the surround-sound signals SL and SR, the controller 50 reduces the step-size parameter μ and increases the addition ratio of the stereo signals, as the value of the parameter k decreases. For example, for the parameter k=1/√2, the controller 50 sets the step-size parameter μ to 0.001 and performs control so that no stereo signals Lt and Rt are added to the surround-sound signals SL and SR. The set value is used as a reference value. As the parameter k decreases, i.e., the cross-correlation coefficient increases, the controller 50 reduces the step-size parameter μ and increases the addition ratio of the stereo signals Lt and Rt. With this arrangement, since both the step-size parameter μ and the addition ratio of the stereo signals are controlled, it is possible to provide surround-sound signals SL and SR having a desired output level.

Figures 13, 14:
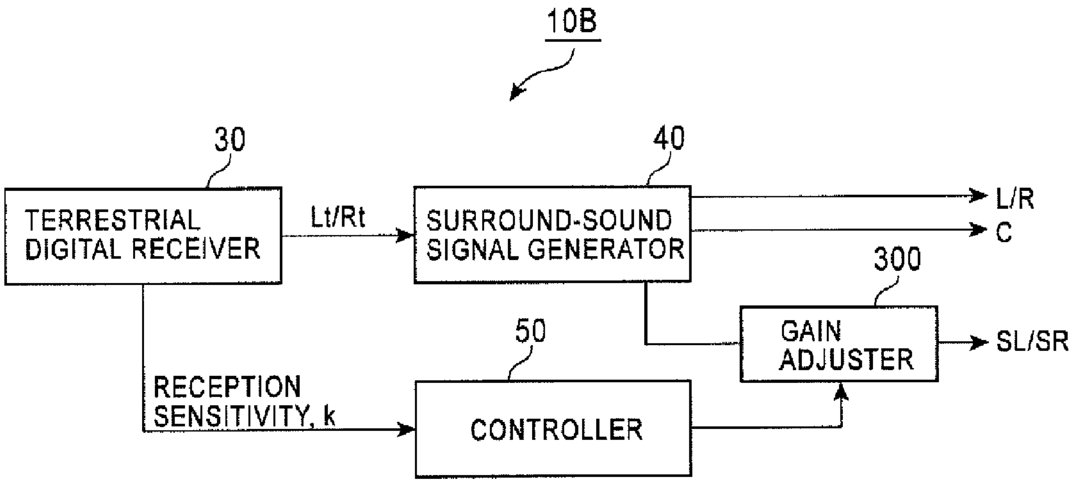
FIG. 13 is a block diagram showing the configuration of an audio apparatus according to a fourth embodiment of the present invention.
FIG. 14 is a block diagram showing the relationship of the value of the parameter k and the output gain of surround-sound signals.

A fourth embodiment of the present invention will now be described FIG. 13 is a block diagram showing the configuration of an audio apparatus according to the fourth embodiment. The audio apparatus 10B according to the fourth embodiment further includes a gain adjuster 300 for adjusting the output gain of the surround-sound signals SL and SR output from the surround-sound signal generator 40. The controller 50 controls the gain adjuster 300 in accordance with the value of the parameter k.

FIG. 14 is a table showing one example of the relationship of the value of the parameter k and an output gain. The controller 50 uses an output gain for the parameter k=1/√2 as the reference value. The controller 50 increases the output gain of the surround-sound signals SL and SR as the value of the parameter k becomes small, i.e., as the cross-correlation coefficient of the stereo signals Lt and Rt becomes large, the controller 50 performs control so that the output gain of the surround-sound signals SL and SR increases. With this arrangement, even when surround-sound signals SL and SR are generated from stereo signals Lt and Rt having a large cross-correlation coefficient, it is possible to prevent a reduction in the output level.

Figure 15:
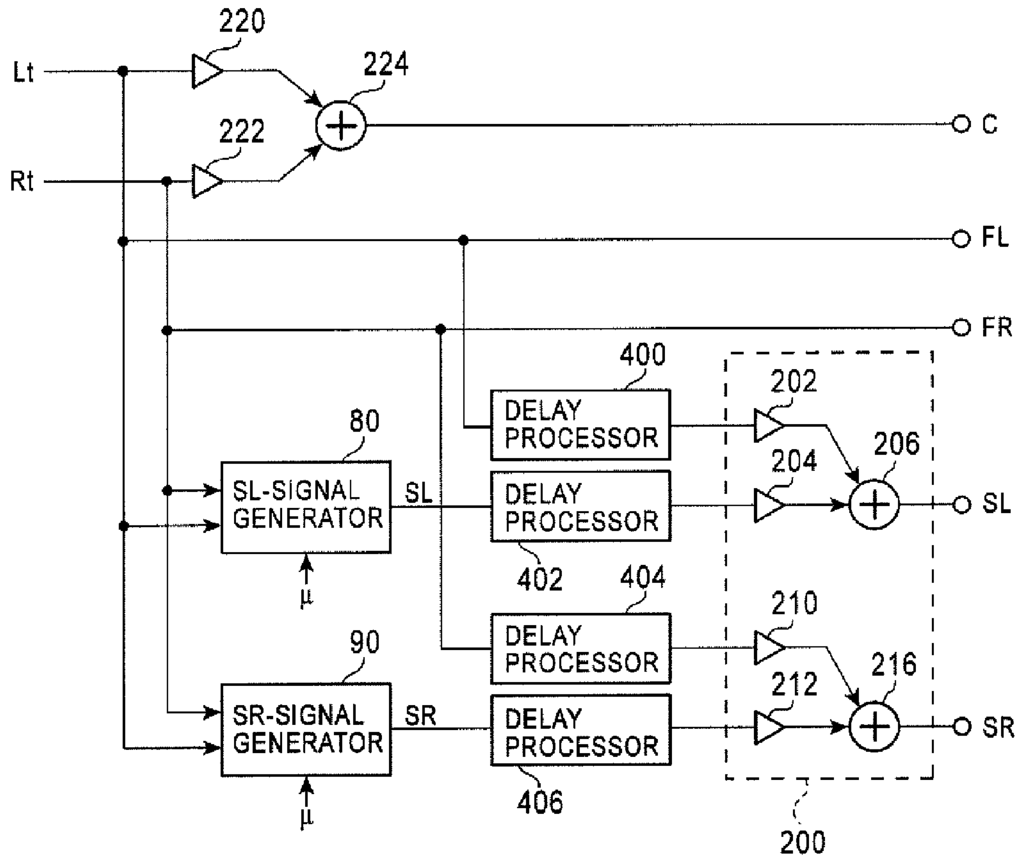
FIG. 15 is a block diagram showing the configuration of an audio apparatus according to a fifth embodiment of the present invention.

A fifth embodiment of the present invention will now be described. FIG. 15 is a diagram showing the configuration of an audio apparatus according to the fifth embodiment. The fifth embodiment is a modification of the second embodiment and has a configuration in which delay processors 400, 402, 404, and 406 are connected to the input ends of the amplifiers 202, 204, 210, and 212, respectively. In accordance with the value of the parameter k, the controller 50 controls the delay times of the delay processors 400 to 406 in addition to controlling the addition ratio for the addition processor 200. In this case, the step-size parameter μ is fixed to, for example, 0.001.

FIG. 16 is a table showing one example of the relationship among the value of the parameter k, the addition ratio, and the delay time. In the fifth embodiment, as the value of the parameter k becomes small, the cross-correlation coefficient increases. Thus, the provision (insertion) of the delay processors 400 to 406 prior to the addition processor 200 can reduce the correlation coefficient of the surround-sound signals SL and SR and can impart a spatial impression. For example, for the parameter k=1/√2, the controller 50 performs control so that no stereo signals Lt and Rt are added to the surround-sound signals SL and SR and uses the amount of delay in this case as a reference value. As the parameter k becomes small, i.e., the cross-correlation coefficient becomes large, the controller 50 increases the addition ratio of the stereo signals Lt and Rt and increases the amount of delay. For the parameter k=0, the controller 50 sets the amount of delay to a settable maximum amount of delay.

In FIG. 15, it is assumed that the delay processors 400 and 404 have the same amount of delay (defined as Δ1) and the delay processors 402 and 406 have the same amount of delay (defined as Δ2). In this case, delay insertion may be performed while maintaining the relationship $\Delta 2 \geqq \Delta 1$, in order to reduce the value of the cross-correlation coefficient.

As described above, when down-mixed stereo signals Lt and Rt sent from the terrestrial digital receiver are converted into surround-sound signals, it is possible to provide homogeneous output levels of the surround-sound signals SL and SR.

A method for processing down-mixed stereo signals Lt and Rt is also defined in ISO/IEC 13818-7, which can become a standard scheme for 5.1-channel down-mix processing. The down-mix algorithms shown in FIGS. 1A and 1B, however, are merely examples and the present invention is not necessarily limited thereto. The present invention is thus applicable to other algorithms.

Although examples in which terrestrial digital broadcast is received have been described in the embodiments, the present invention is also applicable to down-mixing processing (Lo/Ro and Lt/Rt) of an overseas digital television format and a 5.1-channel DVD format.

The above-described embodiments in the present invention may be used independently or may be used in combination.

While there has been illustrated and described what is at present contemplated to be preferred embodiments of the present invention, it will be understood by those skilled in the art that various changes and modifications may be made, and equivalents may be substituted for elements thereof without departing from the true scope of the invention In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An audio apparatus comprising:

An input unit for inputting stereo signals in which surround-sound signals are mixed in accordance with a predetermined algorithm and encoding information specifying encoded contents of the algorithm;

a surround-sound signal generator for generating left-side surround-sound signals and right-side surround-sound signals by decorrelating left-side signals and right-side signals contained in the stereo signals; and a controller for controlling the decorrelation performed by the surround-sound signal generator based on the encoding information;

wherein the surround-sound signal generator comprises a first surround-sound signal generator for generating the left-side surround-sound signals by extracting components that are highly correlated with right-side signals in the left-side signals of the stereo signals and subtracting the extracted components from the left-side signals, and a second surround-sound signal generator for generating the right-side surround-sound signals by extracting components that are highly correlated with left-side signals in the right-side signals of the stereo signals and subtracting the extracted components from the right-side signals;

wherein the controller controls the highly-correlated-component extraction performed by the first and second surround-sound signal generators, based on the encoding information;

wherein the first surround-sound signal generator updates a filter coefficient of an adaptive filter by using an adaptive algorithm to extract the components that are highly correlated with the left-side signals in the right-side signals, and the second surround-sound signal generator updates a filter coefficient of an adaptive filter by using an adaptive algorithm to extract the components that are highly correlated with the right-side signals in the left-side signals, and wherein the controller changes a value of a step-size parameter for determining an adaptation speed of the filter coefficients of the adaptive filters in the first and second surround-sound signal generators, based on the encoding information.

2. The audio apparatus according to claim 1, wherein the controller decrypts a cross-correlation coefficient of the input stereo signals based on the encoding information and selects the value of the step-size parameter in accordance with the decrypted cross-correlation coefficient.

3. The audio apparatus according to claim 2, wherein the controller reduces the value of the step-size parameter as the cross-correlation coefficient of the input stereo signals increases.

4. The audio apparatus according to claim 1, further comprising:

a first adder for adding, at a predetermined level, left-side signals of the stereo signals to the left-side surround-sound signals output from the surround-sound signal generator; and a second adder for adding, at a predetermined level, right-side signals of the stereo signals to the right-side surround-sound signals output from the surround-sound signal generator;

wherein the controller controls the ratio of the addition of the left-side signals at the first adder and the right-side signals at the second adder based on the encoding information.

5. The audio apparatus according to claim 4, wherein the controller decrypts a cross-correlation coefficient of the input stereo signals based on the encoding information and controls the addition ratio of the left-side signals at the first adder and the right-side signals at the second adder in accordance with the decrypted cross-correlation coefficient.

6. The audio apparatus according to claim 5, wherein the controller increases the addition ratio of the left-side signals at the first adder and the right-side signals at the second adder as the cross-correlation coefficient of the input stereo signals increases.

7. The audio apparatus according to claim 4, wherein the surround sound signal generator comprises a first surround-sound signal generator for generating left-side surround-sound signals by extracting components that are highly correlated with right-side signals in the left-side signals of the stereo signals and subtracting the extracted components from the left-side signals, and a second surround-sound signal generator for generating right-side surround-sound signals by extracting components that are highly correlated with left-side signals in the right-side signals of the stereo signals and subtracting the extracted components from the right-side signals;

the first adder adds, at a predetermined level, the left-side signals of the stereo signals to the left-side surround-sound signals output from the first surround-sound signal generator;

the second adder adds, at a predetermined level, the right-side signals of the stereo signals to the right-side surround-sound signals output from the second surround-sound signal generator; and the controller controls the highly-correlated component extraction performed by the first and second surround-sound signal generators based on the encoding information and controls the ratio of the addition of the left-side signals at the first adder and the right-side signals at the second adder based on the encoding information.

8. The audio apparatus according to claim 7, wherein the controller decrypts a cross-correlation coefficient of the input stereo signals based on the encoding information, controls the highly-correlated-component extraction performed by the first and second surround-sound signal generators in accordance with the decrypted cross-correlation coefficient, and controls the addition ratio of the left-side signals at the first adder and the right-side signals at the second adder.

9. The audio apparatus according to claim 8, wherein the controller reduces the highly-correlated components extracted by the first and second surround-sound signal generators and increases the addition ratio of the left-side signals at the first adder and the right-side signals at the second adder as the cross-correlation coefficient of the input stereo signals increases.

10. The audio apparatus according to claim 1, further comprising:

a first delay processor for delaying the left-side signals of the stereo signals;

a second delay processor for delaying the right-side signals of the stereo signals;

a third delay processor for delaying the left-side surround-sound signals;

a fourth delay processor for delaying the right-side surround-sound signals;

a first adder for adding, at a predetermined level, the left-side signals delayed by the first delay processor to the left-side surround-sound signals delayed by the third delay processor; and a second adder for adding, at a predetermined level, the right-side signals delayed by the second delay processor to the right-side surround-sound signals delayed by the fourth delay processor;

wherein the controller controls the ratio of the addition of the left-side signals at the first adder and the right-side signals at the second adder based on the encoding information and controls amounts of the delay of the first, second, third, and fourth delay processors.

11. The audio apparatus according to claim 10, wherein the controller decrypts a cross-correlation coefficient of the input stereo signals based on the encoding information, controls the addition ratio of the left-side signals at the first adder and the right-side signals at the second adder in accordance with the decrypted cross-correlation coefficient, and controls the amounts of the delay of the first, second, third, and fourth delay processors.

12. The audio apparatus according to claim 11, wherein the controller increases the addition ratio of the left-side signals at the first adder and the right-side signals at the second adder as the cross-correlation coefficient increases.

13. The audio apparatus according to claim 11, wherein the amount of the delay of the third and fourth delay processors is not less than the amount of the delay of the first and second delay processors.

14. The audio apparatus according to claim 1, wherein the stereo signals comprise left-side signals Lt and right-side signals Rt expressed by:

$$Lt = a\times\left(L + \frac{1}{\sqrt{2}}\times C + k\times Sl\right),\ Rt = a\times\left(R + \frac{1}{\sqrt{2}}\times C + k\times Sr\right)$$

where a indicates a constant, L indicates left-side signals of the stereo signals, C indicates center signals, k indicates a parameter that changes in accordance with the contents of the algorithm, and Sl and Sr indicate the surround-sound signals.

15. The audio apparatus according to claim 14, wherein the controller decrypts a cross-correlation coefficient of the input stereo signals Lt and Rt based on the parameter k.

16. The audio apparatus according to claim 1, wherein the stereo signals comprise left-side signals Lt and right-side signals Rt expressed by:

$$Lt = a\times\left(L + \frac{1}{\sqrt{2}}\times C - k\times(Sl+Sr)\right),$$

$$Rt = a\times\left(R + \frac{1}{\sqrt{2}}\times C + k\times(Sl+Sr)\right)$$

where a indicates a constant, L indicates left-side signals of the stereo signals, C indicates center signals, k indicates a parameter that changes in accordance with the contents of the algorithm, and Si and Sr indicate the surround-sound signals.

17. An audio system comprising:

an audio apparatus according to claim 1;

a first set of speakers that outputs sound based on the left-side signals and the right-side signals of the stereo signals; and a second set of speakers that outputs sound based on the left-side surround-sound signals and the right-side surround-sound signals.

18. The audio system according to claim 17, further comprising a center speaker that is disposed in the vicinity of the middle of the first set of speakers and that outputs sound based on signals obtained by adding the left-side signals and the right-side signals of the stereo signals at a predetermined ratio, and a subwoofer that is disposed in the vicinity of the middle of the second set of speakers and that outputs sound based on low-frequency components of the stereo signals.

19. An audio apparatus comprising:

an input unit for inputting stereo signals in which surround-sound signals are mixed in accordance with a predetermined algorithm and encoding information specifying encoded contents of the algorithm;

a surround-sound signal generator for generating left-side surround-sound signals and right-side surround-sound signals by decorrelating left-side signals and right-side signals contained in the stereo signals;

a gain adjuster for adjusting an output gain of the left-side surround-sound signals and the right-side surround-sound signals output from the surround-sound signal generator; and a controller for controlling the gain adjuster based on the encoding information, wherein the controller decrypts a cross-correlation coefficient of the input stereo signals based on the encoding information and controls the output gain of the left-side surround-sound signals and the right-side surround-sound signals in accordance with the decrypted cross-correlation coefficient.

20. The audio apparatus according to claim 19, wherein the controller increases the output gain of the left-side surround-sound signals and the right-side surround-sound signals as the cross-correlation coefficient increases.

* * * * *